US012705925B2

(12) United States Patent
Cheng

(10) Patent No.: US 12,705,925 B2
(45) Date of Patent: Aug. 11, 2026

(54) METHOD, ELECTRONIC DEVICE, AND STORAGE MEDIUM FOR IMAGE PROCESSING

(71) Applicant: BEIJING BYTEDANCE NETWORK TECHNOLOGY CO., LTD., Beijing (CN)

(72) Inventor: Ziyang Cheng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 267 days.

(21) Appl. No.: 18/571,579

(22) PCT Filed: Sep. 29, 2022

(86) PCT No.: PCT/CN2022/122489
§ 371 (c)(1),
(2) Date: Dec. 18, 2023

(87) PCT Pub. No.: WO2023/071694
PCT Pub. Date: May 4, 2023

(65) Prior Publication Data

US 2024/0290135 A1 Aug. 29, 2024

(30) Foreign Application Priority Data

Oct. 29, 2021 (CN) ......................... 202111275627.4

(51) Int. Cl.
*G06V 40/16* (2022.01)
*G06V 10/77* (2022.01)

(52) U.S. Cl.
CPC ............. *G06V 40/16* (2022.01); *G06V 10/77* (2022.01)

(58) Field of Classification Search
CPC ........ G06V 40/16; G06V 10/77; G06V 10/82; G06F 18/00; G06N 3/04; G06N 3/08; G06N 20/00
See application file for complete search history.

(56) References Cited

U.S. PATENT DOCUMENTS 12,154,380 B2 * 11/2024 Cao ......................... G06T 15/04
12,461,590 B1 * 11/2025 Doke ................ G06Q 30/0201
(Continued)

FOREIGN PATENT DOCUMENTS

CN 108875521 A 11/2018
CN 109583385 A 4/2019
(Continued)

OTHER PUBLICATIONS

Office Action for Chinese Patent Application No. 202111275627.4, mailed on Mar. 14, 2025, 11 pages.
(Continued)

*Primary Examiner* — Ming Y Hon
(74) *Attorney, Agent, or Firm* — Astute IP Law Group

(57) ABSTRACT

Embodiments of the disclosure provide a method, apparatus, electronic device (700), and storage medium for image processing. The method inputting a to-be-processed facial image to a predetermined model (S110); and outputting, by the predetermined model, a target facial image (S120) with a predetermined object removed from the to-be-processed facial image; wherein the predetermined model is trained and generated based on an attention map (a) of the predetermined object. Since the predetermined model is trained based on the attention map (a) of the predetermined object, it is able to first generate the attention map (a) of the predetermined object based on unpaired data training, and
(Continued)

then train to remove the predetermined object from the facial image with the attention map (a) of the predetermined object.

18 Claims, 5 Drawing Sheets

(56) References Cited

U.S. PATENT DOCUMENTS

2017/0069065 A1 3/2017 Lin
2019/0236759 A1 8/2019 Lai et al.
2020/0401790 A1* 12/2020 Hu ............................ G06T 3/18
2021/0027098 A1* 1/2021 Ge ........................ G06F 18/217
2021/0248177 A1* 8/2021 Srinivasan ............ G06F 16/538
2021/0279515 A1* 9/2021 Zhang ................... G06F 18/214
2023/0033442 A1* 2/2023 Xiang .................... G06N 3/088
2023/0196735 A1* 6/2023 Zhang .................. G06V 10/776 382/156
2023/0326545 A1* 10/2023 Narayanan ............. G06N 20/00 703/11
2024/0013504 A1* 1/2024 Yu .......................... G06V 10/80
2025/0029289 A1* 1/2025 Bai ......................... G06T 11/00

FOREIGN PATENT DOCUMENTS

CN 110136054 A 8/2019
CN 110378979 A 10/2019
CN 111612872 A 9/2020
CN 111814566 A 10/2020
CN 112287852 A 1/2021
CN 113298052 A 8/2021
CN 114022931 A 2/2022

OTHER PUBLICATIONS

International Search Report (with English translation) and Written Opinion issued in PCT/CN2022/122489, dated Dec. 15, 2022, 11 pages provided.

* cited by examiner

METHOD, ELECTRONIC DEVICE, AND STORAGE MEDIUM FOR IMAGE PROCESSING

CROSS REFERENCE

Embodiments of the present disclosure claims priority to Chinese Patent Application No. 202111275627.4, filed with the Chinese Patent Office on Oct. 29, 2021, the entirety of which is incorporated herein by reference.

FIELD

The present disclosure generally relates to the field of image processing, for example, to a method, apparatus, electronic device, and storage medium for image processing.

BACKGROUND

Nowadays, facial image beautification has been widely applied in various application software, such as image/video editing software, capturing software, etc.

In related technologies, it is usually necessary to collect a large amount of paired data (i.e., images of the same person in different states) for model training and implement the transformation of different face states in the face images based on the trained model. The shortcomings of these techniques comprise, at least, that it is difficult to collect paired data, which makes it difficult to obtain and increases the training cost.

SUMMARY

The present disclosure provides a method, apparatus, electronic device, and storage medium for image processing to implement a model for removing a predetermined object from face images.

In a first aspect, embodiments of the present disclosure provide a method of image processing, comprising:

- inputting a to-be-processed facial image to a predetermined model; and
- outputting, by the predetermined model, a target facial image with a predetermined object removed from the to-be-processed facial image;
- wherein the predetermined model is trained and generated based on an attention map of the predetermined object.

In a second aspect, embodiments of the present disclosure further provide an apparatus for image processing, comprising:

- an input module configured to input a to-be-processed facial image to a predetermined model; and
- an output module configured to output, by the predetermined model, a target facial image with a predetermined object removed from the to-be-processed facial image;
- wherein the predetermined model is trained and generated based on an attention map of the predetermined object.

In a third aspect, embodiments of the present disclosure further provide an electronic device, comprising:

- one or more processors; and
- a storage apparatus configured to store one or more programs;
- wherein the one or more programs, when executed by the one or more processors, cause the one or more processors to implement the method of image processing according to any one of embodiments of the present disclosure.

In a fourth aspect, embodiments of the present disclosure further provide a storage medium comprising computer-executable instructions, the computer-executable instructions, when executed by a computer processor, causing the method of image processing according to any one of embodiments of the present disclosure.

BRIEF DESCRIPTION OF THE DRAWINGS

Throughout the accompanying drawings, the same or similar reference numerals represent the same or similar elements. It should be understood that the accompanying drawings are schematic and that the originals and elements are not necessarily drawn in accordance with scale.

DETAILED DESCRIPTION

Embodiments of the present disclosure will be described below with reference to the accompanying drawings. Although some embodiments of the present disclosure are shown in the accompanying drawings, it should be understood that the present disclosure can be implemented in various forms, and these embodiments are provided for a more thorough and complete understanding of the present disclosure. It should be understood that the drawings and embodiments of the present disclosure are intended to be exemplary only.

It should be understood that the various steps documented in the method embodiments of the present disclosure may be performed in a different order, and/or in parallel. In addition, the method embodiments may comprise additional steps and/or omit performing the illustrated steps. The scope of the present disclosure is not limited in this regard.

As used herein, the term "comprises" and its variations are open-ended, i.e., "comprising, but not limited to". The term "based on" is "based at least partially on". The term "one embodiment" represents "at least one embodiment"; the term "another embodiment" represents "at least one additional embodiment"; the term "some embodiments" represents "at least some embodiments". Related definitions of other terms will be given in the description below.

It should be noted that references to the concepts of "first", "second" and the like in the present disclosure are only used to distinguish different apparatuses, modules, or units, and are not intended to limit the order or interdependence of the functions performed by these apparatuses, modules, or units. It should be noted that references to the qualifications "one" and "a plurality of" in the present disclosure are schematic rather than limiting. It should be understood by those skilled in the art that the term "one or more" should be understood unless the context clearly indicates otherwise.

Figure 1:
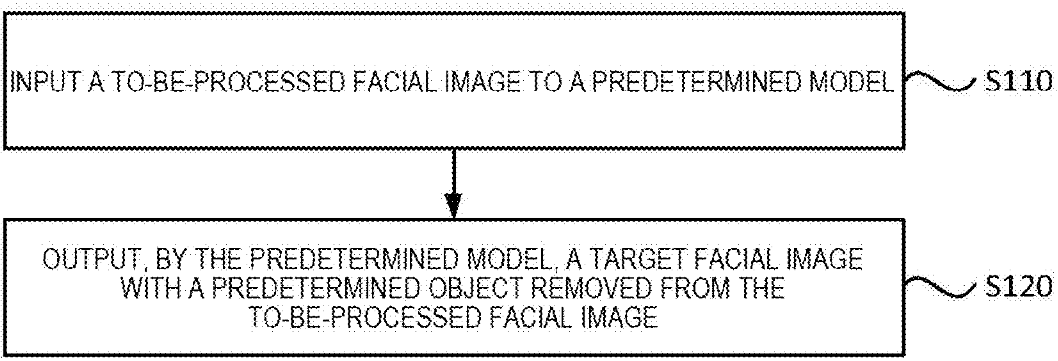
FIG. 1 shows a schematic flowchart of a method of image processing provided by an embodiment of the present disclosure.

FIG. 1 shows a schematic flowchart of a method of image processing provided by an embodiment of the present disclosure. Embodiments of the present disclosure are applicable to a situation where a predetermined object in an image is removed with a predetermined model trained on the unpaired data. The method may be implemented by an apparatus for image processing, which may be implemented in the form of software and/or hardware.

As shown in FIG. 1, the method of image processing provided in the present embodiment, comprises:

S110. Input a to-be-processed facial image to a predetermined model.

S120. Output, by the predetermined model, a target facial image with a predetermined object removed from the to-be-processed facial image.

The apparatus for performing the method of image processing provided by embodiments of the present disclosure may be integrated in an application software supporting the function of image processing and may be installed in an electronic device such as a server, a mobile phone, a computer, and the like, along with the application software. Herein, the application software may be a multimedia application software involving images/videos, such as image/video editing software, capturing software, multimedia sharing software, multimedia communication software, and the like, without being over-exhausted herein.

When the electronic device runs the application software, the application software may invoke the image collection function of the electronic device to collect the to-be-processed facial images and may also read the to-be-processed facial images in the storage space of the electronic device. Herein, the to-be-processed face image may be a face image comprising a predetermined object. Herein, the predetermined object may be understood as an object expected to be removed from the facial image, such as an object comprising, but not limited to, a mustache, bangs, or bags under the eyes.

The application software may further receive a processing instruction for the to-be-processed facial image. Moreover, an apparatus for image processing may be invoked in response to the processing instruction to input the to-be-processed facial image into a predetermined model by the apparatus for image processing and output the target facial image that removes the predetermined object from the to-be-processed facial image by the predetermined model. By utilizing the predetermined model for face image processing, a special effect plays for removing the predetermined object in the image can be implemented, with to improve the user experience.

Herein, the predetermined model may be considered as a machine learning model, such as a neural network model, and the predetermined model may be generated based on the training of the attention map of the predetermined object. The training process of the predetermined model may comprise first generating an attention map of the predetermined object based on the training of the unpaired data, and then removing the predetermined object in the facial image with the training of the attention map of the predetermined object.

Herein, if the images in one set of images can be paired with the images in another set of images, then the two sets of images can be considered as paired data; on the contrary, if there are images that cannot be paired, then the two sets of images can be considered as unpaired data. Herein, if the difference between the two images is the presence or absence of a predetermined object, and other predetermined factors are the same (e.g., belonging to the same body, the same ambient illumination, the same positional attitude, etc.), the two images can be considered to be paired. In the present embodiment, two sets of images belonging to any individual, with and without the presence of a predetermined object, may be determined as unpaired data.

In the field of machine learning, the attention mechanism may comprise a significance-based attention mechanism. In the present embodiment, the attention mechanism may be trained to produce an attention map of the predetermined object based on significance, for example, comprising: based on a significant difference (e.g., the presence or absence of the predetermined object) in the input unpaired data, selecting the differentiated data from the input data to be focused processing, and ignoring the other data, to determine the attention map of the predetermined object. Furthermore, after determining the attention map of the predetermined object, training may be performed to remove the predetermined object from the corresponding original image based on the position of the predetermined object in the attention map of the predetermined object.

Since the predetermined model is trained based on the attention map of the predetermined object, the attention map of the predetermined object can be generated based on the training of unpaired data, and then the predetermined object in the facial image can be removed with the training of the attention map of the predetermined object. Thus, the model for removing the predetermined object in the facial image can be implemented based on the unpaired data, reducing the training cost.

Figure 2:
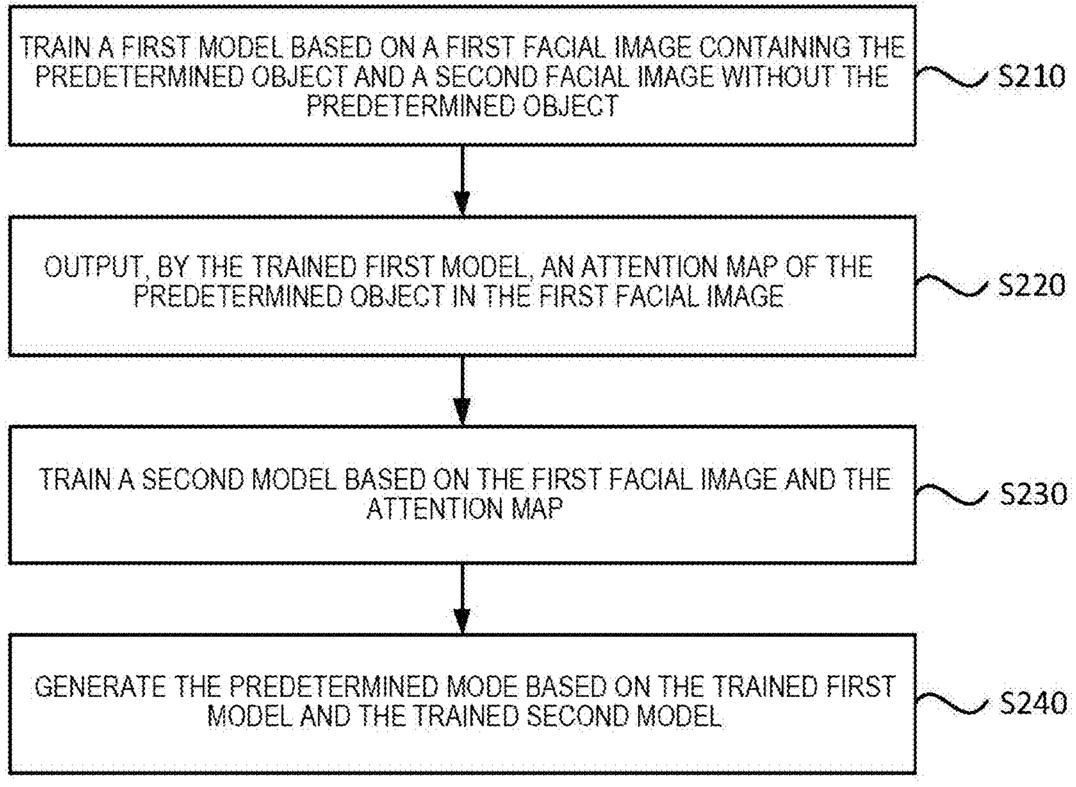
FIG. 2 shows a schematic flowchart of a predetermined model training step in a method of image processing provided by an embodiment of the present disclosure.

As for an example, FIG. 2 shows a schematic flowchart of a predetermined model training step in a method of image processing provided by an embodiment of the present disclosure. Referring to FIG. 2, for example, a predetermined model may be generated based on the following:

S210. Train a first model based on a first facial image containing the predetermined object and a second facial image without the predetermined object.

Herein, the first facial image includes the predetermined object, the second facial image does not include the predetermined object, and the first facial image and the second facial image may be unpaired facial images. The method of obtaining the first facial image and the second facial image may comprise at least one of the following: obtaining by collecting the facial image under the authorization of the user to whom it belongs; obtaining by rendering the avatar; and automatically generating with the network. In addition, the first facial image and the second facial image can be obtained in other ways, which are not exhaustive here. Theoretically, the more the number of obtained first facial images and second facial images, and the more the angles/lighting of the characters in the images are varied, the more favorable it is for the learning and training of the first model.

The first model can be considered as a machine learning model, such as a neural network model. Since the first facial image and the second facial image are categorized in accordance with the presence or absence of the predetermined object, the predetermined object can be considered to be the significant difference between the two types of images. The attention map of the predetermined objects can be regarded as the image output by the first model after highlighting the predetermined objects contained in the facial images under the attention mechanism based on significance. Herein, the highlighting of the predetermined object may be performed by setting a pixel value of a pixel of the predetermined object to be different from a pixel value of other pixels, for example, by setting a pixel of the predetermined object to be a white pixel value, and by setting a pixel value of the other pixels to be a black pixel value.

Herein, the first model can be trained to automatically distinguish the difference between the two types of images, the first facial image and the second facial image, to implement the localization of the predetermined object. Training the first model and the second face image based on the unpaired first face image may comprise: predicting significant differences between the two types of images by weakly supervised learning in the case that the first model only determines the classification of the first face image and the second face image; and modifying the parameters of the multilayer network in the first model with the goal of improving the prediction accuracy during the learning process, thereby implementing the training of the first model.

S220. Output, by the trained first model, an attention map of the predetermined object in the first facial image.

Herein, the trained first model can implement the localization of the predetermined object and highlight the pixel points of the predetermined object for display to obtain an attention map of the predetermined object.

S230. Train a second model based on the first facial image and the attention map.

Herein, the second model can also be considered as a machine learning model, such as a neural network model. The attention map generally has the same resolution as the first facial image. The second model may process the corresponding predetermined object in the first facial image based on the position of the predetermined object in the attention map and output an image of the first facial image after the predetermined object is removed. Furthermore, the second model may be trained on the image output by the second model and the second facial image so that the image output by the second model may converge to an image that does not include the predetermined object.

S240. Generate the predetermined mode based on the trained first model and the trained second model.

First performing the first stage of training on the first model by utilizing the unpaired first facial image and the second facial image, causing the first model to automatically distinguish the difference between the first facial image and the second facial image to locate a predetermined object and output an attention map of the predetermined object. By training the second model based on the attention map and the first facial image, the second model can implement the effect of removing the predetermined object.

After the first model and the second model have been trained, generate a predetermined model by the first model and the second model, which may comprise, but is not limited to: combining the first model and the second model as sub-models to obtain a predetermined model; or, processing unpaired data into paired data based on the first model and the second model, and performing model training based on the paired data to obtain a predetermined model.

The technical solution of embodiments of the present disclosure is to input a to-be-processed facial image into a predetermined model; to output a target facial image that removes a predetermined object from the to-be-processed facial image via the predetermined model; wherein the predetermined model is generated based on the training of an attention map of the predetermined object. Since the preset model is trained based on the attention map of the preset object, the attention map of the predetermined object can be generated based on the training of unpaired data, and then the attention map of the predetermined object can be used to train the removal of the predetermined object in the facial image. Thus, the model for removing the predetermined object in the facial image can be implemented based on the unpaired data, reducing the training cost.

Embodiments of the present disclosure may be combined with a plurality of example embodiments of training of a predetermined model in the method of image processing provided in the above embodiments. The present embodiments provide a detailed description of the steps of training the first model and the second model.

In embodiments of the present disclosure, the first model can be trained based on the following:

setting different image labels for the first facial image and the second facial image; inputting the first facial image, the second facial image, and the image labels corresponding to the respective facial images into the first model; determining a candidate object by the first model, and outputting prediction labels for the first facial image and the second facial image based on the candidate object; and training the first model based on the prediction labels and the set image labels, and determining the candidate object determined by the trained first model as the predetermined object.

Herein, an image label may be set for the first facial image and the second facial image respectively, and the two image labels may uniquely correspond to the two types of images. Herein, the image label may be composed of at least one element such as a text, a word, a number, and a special symbol. For example, the image label of the first facial image may be set as a “positive sample”, and the image label of the second facial image may be set as a “negative sample”, and so on.

By inputting the image labels of the first facial image, the second facial image, and respective image into the first model, the first model can determine the classification of the first facial image and the second facial image. After determining the classification of the facial images, the first model may loop to determine the candidate objects and reclassify the input facial images based on the candidate objects determined in the current loop to obtain a predicted label for respective facial image. The first model may be trained with the goal that the predicted labels are consistent with the set image labels, to train the first model to be able to accurately distinguish a significant difference between the first face image and the second face image, i.e., to locate the predetermined object.

Figure 3:
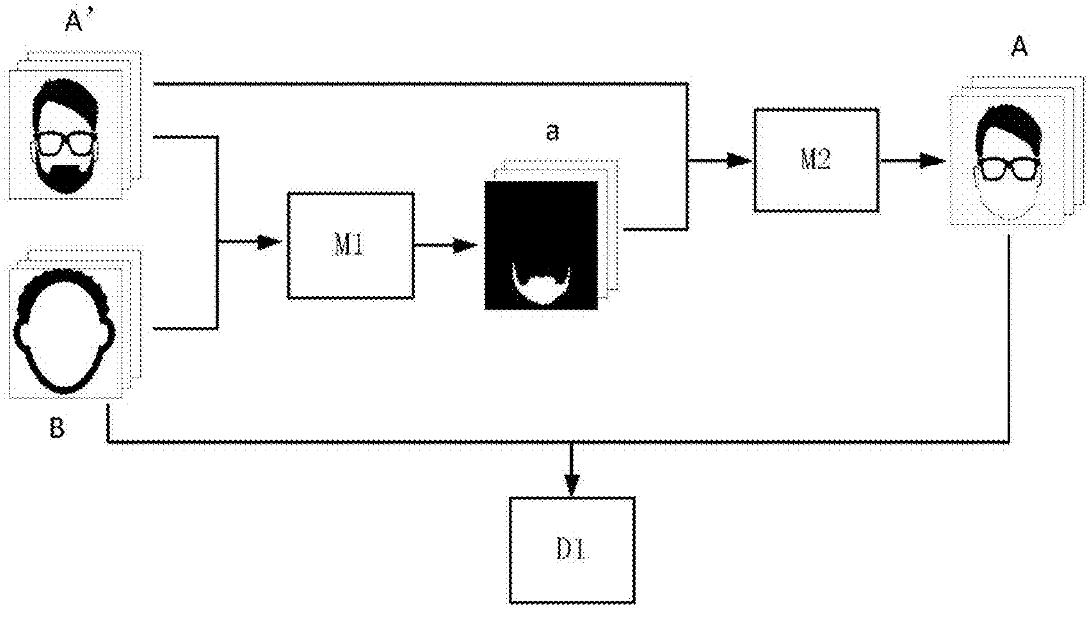
FIG. 3 shows a schematic diagram of a predetermined model training step in a method of image processing provided by another embodiment of the present disclosure.

As an example, FIG. 3 shows a schematic diagram of a predetermined model training step in a method of image processing provided by another embodiment of the present disclosure. Referring to FIG. 3, a large number of unpaired first facial images A' and second facial images B, may be inputted into the first model M1, so that the first model M1 may be trained to automatically localize a predetermined object (e.g., a mustache) that is different in the first facial images A' and the second facial images B, and output an attention map a of the predetermined object.

In embodiments of the present disclosure, the second model can be trained based on the following:

inputting the first facial image and the attention map to the second model, and outputting, by the second model, a third facial image with the predetermined object removed from the first facial image; and inputting the second facial image and the third facial image to a first discriminator, and training the second model based on a result of the first discriminator.

Herein, the attention map is the attention map of the predetermined object output when the first model is trained, and the attention map may not be updated during the training of the second model. Since the attention map highlights the predetermined object, the second model can determine the position of the predetermined object in the first facial image based on the attention map, and can remove the predetermined object from the second model based on the position to obtain the third facial image.

Referring again to FIG. 3, the first facial image A' input to the first model M1 and the attention map an output by the first model M1 may be determined as an input to the second model M2 to cause the second model M2 to output a third facial image A that removes the predetermined object in the first facial image A'.

Herein, the second model and the first discriminator may comprise a generative adversarial network, and may be trained with the generative adversarial network, and the training process may also comprise two stages: first, in the stage of training the first discriminator, i.e., when the parameters of the second model are fixed, the second model is used to output the third facial image; the third facial image and the second facial image are input into the first discriminator, to discriminate these facial images by the first discriminator that whether the facial images belong to a real facial image that does not include a predetermined object, or whether they belong to a facial image that has had a predetermined object removed by the second model. Furthermore, the first discriminator can be trained with the goal of increasing the correctness of the result. Second, in the stage of training the second model, i.e., if the parameters of the first discriminator are fixed, the second model is trained with the goal that the first discriminator cannot distinguish the second facial image from the third facial image. The two-stage training process for generating the adversarial network can be cycled sequentially, and the second model can be trained first or the first discriminator can be trained first, and the training can be cycled to a predetermined condition to stop training. Herein, the predetermined conditions may comprise, but are not limited to, a predetermined number of cycles, the accuracy of the first discriminator is up to a certain level of accuracy, and so on, which are not exhaustive herein.

Further referring to FIG. 3, the second facial image B and the third facial image A can be input into the first discriminator DI, so that the first discriminator DI can discriminate whether the facial images belong to a real facial image that does not contain a predetermined object, or whether the facial images belong to a facial image in which a predetermined object has been removed by the second model M2. The first discriminator DI can be trained with the objective of increasing the correctness of the discrimination result. After the first discriminator DI is trained, the second model M2 can be trained by fixing the parameters of the first discriminator DI with the goal that the first discriminator DI cannot discriminate between the second facial image B and the third facial image A.

The effect of the second model in removing the predetermined objects can be improved by training the second model and the first discriminator to play with each other. By training a model for removing a predetermined object in a facial image based on unpaired data, the dependence on paired data in the model training process can be reduced, thereby reducing costs.

For example, by outputting the third facial image that removes the predetermined object in the first facial image through the second model, comprises processing, by the second model and based on the attention map, pixel points corresponding to the predetermined object in the first facial image, and outputting the third facial image with the predetermined object removed.

In these embodiments, the second model may determine a coordinate position of a pixel point of the predetermined object in the first facial image based on the attention map and may process the predetermined object in the first facial image based on the coordinate position on a pixel-by-pixel basis to obtain a third facial image with the predetermined object removed. Herein, processing the predetermined object in the first facial image on a pixel-by-pixel basis may comprise changing pixel values of the predetermined object on a pixel-by-pixel basis. Herein, changing the pixel values of the predetermined object may comprise changing the pixel values of the pixel points of the predetermined object using pixel values of pixel points adjacent to the pixel points surrounding the predetermined object, or using pixel values of pixel points at other locations of the facial organization, to achieve the effect of removing the predetermined object.

For example, processing the pixel point corresponding to the predetermined objects in the first facial image comprises: copying and transferring the pixel point in the first facial image that are not labeled by the attention map to the position of the pixel point labeled by the attention map; wherein the pixel point labeled by the attention map belong to the predetermined object. For example, the attention map may label the predetermined objects on a pixel-by-pixel basis. Accordingly, the second model may copy and transfer the unmarked pixel to the position of the marked pixel to overwrite the original marked predetermined object, thereby removing the predetermined object.

In addition, before outputting the third facial image with the predetermined object removed, the third facial image may further comprise: performing a predetermined adjustment processing on the third facial image. Herein, the predetermined adjustment may be image fine-tuning, such as smoothing or filtering the pixel values of the image, so as to make the rough result after removing the predetermined object based on the attention map more realistic and natural.

The technical solution of embodiments of the present disclosure describes in detail the training steps of the first model and the second model. Reclassifying the first/second facial image input based on the candidate objects determined in the current loop by an object determined in the first model loop, to obtain a predicted label for respective facial image; and training the first model with the goal of consistency between the predicted label and the set image label, so that the trained first model can accurately differentiate between the first facial image and the second facial image, i.e., locate the predetermined object. By training the second model and the first discriminator to mutually compete, the effect of the second model in removing the predetermined object can be improved. By training the model for removing the predetermined objects from the facial images based on unpaired data, the dependence on paired data for the model training process can be significantly decreased, and thus the cost can be reduced.

The scheme of model training in the method of image processing provided by embodiments of the present disclosure and the scheme of model training in the method of image processing provided in the embodiments described above belong to the same disclosure idea, and technical details not described in detail in the present embodiments can be found in the embodiments described above, and the same technical features have the same beneficial effect in the present embodiments and the embodiments described above.

Embodiments of the present disclosure can be combined with several example programs of predetermined model training in the method of image processing provided in the above-described embodiments. The present embodiments provide a detailed description of the step of generating a predetermined model based on the trained first model and the trained second model.

For example, generating the predetermined mode based on the trained first model and the trained second model comprises: establishing a connection between an output layer of the trained first model and an input layer of the trained second model, to integrate into the predetermined model.

For example, the first model and the second model can be integrated as sub-models to obtain a model with predetermined objects removed from the image. Herein, establishing a connection between an output layer of the trained first model and an input layer of the trained second model comprises: determining the output layer of the first model that outputs the attention map as the input layer of the second model, and establishing a connection between the input layer of the first model that inputs the first face image and the input layer of the second model. Training the integrated model in two stages by using the unpaired face images, i.e., training the first model in the first stage by using the first face image and the second face image, and training the second model in the second stage by using the attention map output from the first model, the first face image and the second face image. The integrated predetermined model after training, i.e., can implement the removal of the predetermined objects in the image.

In addition, in some other ways of generating a predetermined model: first, the third model can be pre-trained with a small amount of collected paired data (i.e., fourth/fifth facial images), at which time, due to the small amount of training data, the third model can be trained with a poor effect of removing the predetermined object. Then, by processing a large number of sixth face images containing preset objects with the third model, a large number of images with unclean removal of preset objects can be obtained and determined as the first facial image containing preset objects. Then, by using the trained first model and the trained second model, a third face image with the preset object cleanly removed can be obtained, and a large number of pairs of data (i.e., the third/sixth face images) can be obtained. Finally, a large number of pairs of images can be used to optimize the third model, and the optimized third model is determined as the predetermined model. In this way, it can implement the training of the third model with a small amount of paired data and a large amount of unpaired data, so that the third model has a good effect of removing the predetermined objects.

Figure 4:
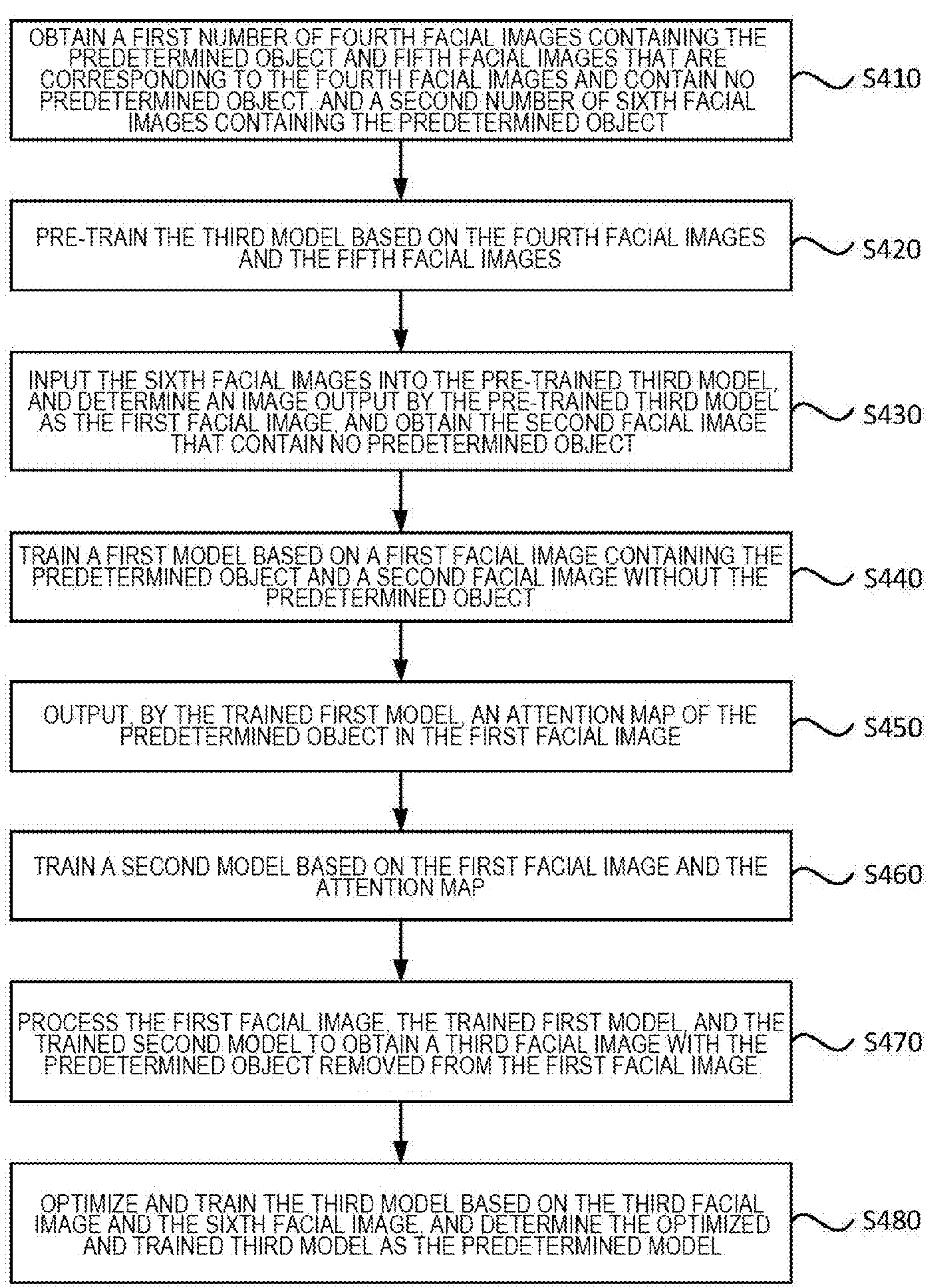
FIG. 4 shows a schematic flowchart of a predetermined model training step in a method of image processing according to another embodiment of the present disclosure.

As an example, FIG. 4 shows a schematic flowchart of a predetermined model training step in a method of image processing according to another embodiment of the present disclosure. As shown in FIG. 4, in some embodiments, the predetermined model may be generated based on the following:

S410. Obtain a first number of fourth facial images containing the predetermined object and fifth facial images that are corresponding to the fourth facial images and contain no predetermined object, and a second number of sixth facial images containing the predetermined object.

In the present embodiment, the fourth facial image contains the predetermined object, the fifth facial image does not contain the predetermined object, and the fourth facial image and the fifth facial image may be pairs of facial images. Herein, the sixth facial image also contains the predetermined object, and the fourth facial image may overlap with the sixth facial image. The obtaining method of the fourth/fifth/sixth facial images can be referred to other embodiments of the present disclosure and will not be repeated herein.

Since it is difficult to collect pairs of images, a first number of pairs of the fourth/fifth facial images can be obtained within a certain range of collection costs. On the other hand, it is less difficult to collect only the sixth facial image containing the predetermined object, and a large number of sixth images can be obtained. The second number can be larger than the first number, and can be much larger than the first number, while controlling the collection cost.

S420. Pre-train the third model based on the fourth facial images and the fifth facial images.

In the present embodiment, the third model may also be considered a machine learning model, such as a neural network model. Pre-training the third model based on the fourth facial images and the fifth facial images comprises: generating an image with a predetermined object removed from the fourth facial image with the third model, and training the third model with a goal of achieving a predetermined degree of similarity between the output image and the fifth facial image.

For example, the third model may be pre-trained based on the following: inputting the fourth facial image into the third model so that the third model outputs the seventh facial image; inputting the fifth facial image and the seventh facial image into the second discriminator, and pre-training the third model based on a result of the second discriminator.

In these embodiments, the third model and the second discriminator may also comprise a generative adversarial network, and may be trained with the generative adversarial network, and the training process may also comprise two stages: the training process may also comprise two stages: (1) a stage of training the second discriminator, i.e., outputting a seventh facial image using the third model with the parameters of the third model fixed; and (2) inputting the fifth facial image and the seventh facial image into the second discriminator, so as to discriminate by the second discriminator whether the facial images belong to real facial images that do not contain the predetermined object, or whether they belong to the facial images that are removed from the predetermined object by the third model. Furthermore, the second discriminator can be trained with the goal of increasing the accuracy of the discrimination result. Second, the stage of training the third model, i.e., if the parameters of the second discriminator are fixed, the third model can be trained with the goal that the second discriminator cannot distinguish between the fifth and the seventh facial images. The two-stage training process can be cycled sequentially, and the third model can be trained first and the second discriminator can be trained first, or the training can be cycled to a predetermined condition to stop training. The predetermined conditions may comprise, but are not limited to, a predetermined number of cycles, the accuracy of the second discriminator is up to a certain precision, etc., which are not exhaustive.

A small amount of paired data (i.e., the fourth/fifth facial images) can be collected for pre-training of the third model, which is less effective in removing predetermined objects due to the small amount of training data.

S430. Input the sixth facial images into the pre-trained third model, and determine an image output by the pre-trained third model as the first facial image, and obtain the second facial image that contain no predetermined object.

By processing a large number of sixth facial images containing predetermined objects with the pre-trained third model, a large number of facial images with poor predetermined object removal effects can be obtained. Since the predetermined objects cannot be removed from the images output by the third model at this time, these facial images can be determined as the first facial image and the removal of the predetermined objects can be continued. In addition, the obtained second facial image and the fifth facial image may overlap.

S440. Train a first model based on a first facial image containing the predetermined object and a second facial image without the predetermined object.

S450. Output, by the trained first model, an attention map of the predetermined object in the first facial image.

S460. Train a second model based on the first facial image and the attention map.

S470. Process the first facial image, the trained first model, and the trained second model to obtain a third facial image with the predetermined object removed from the first facial image.

After the first model and the second model have been trained, the first facial image can be processed by the first model to obtain a corresponding attention map, and the first facial image and the attention map can be processed by the second model to obtain a third facial image with the predetermined object in the first facial image removed. Thus, based on the trained first model and the second model, a large number of paired facial images (i.e., a large number of sixth facial images containing a predetermined object and a large number of third facial images containing no predetermined object) can be obtained based on a large number of unpaired facial images (i.e., a large number of first facial images and second facial images).

S480. Optimize and train the third model based on the third facial image and the sixth facial image, and determine the optimized and trained third model as the predetermined model.

By optimizing the training of the third model based on a large number of paired facial images, the third model can be optimized to have a better effect of removing predefined objects. Thus, it can be implemented that the third model can be trained with a small amount of paired data and a large amount of unpaired data, so that the third model has a good effect of removing beards. In addition, compared with the traditional collection of paired facial images, the cost of data collection can be greatly reduced by producing a large number of paired facial images based on the trained first model and the second model based on unpaired facial images.

Figure 5:
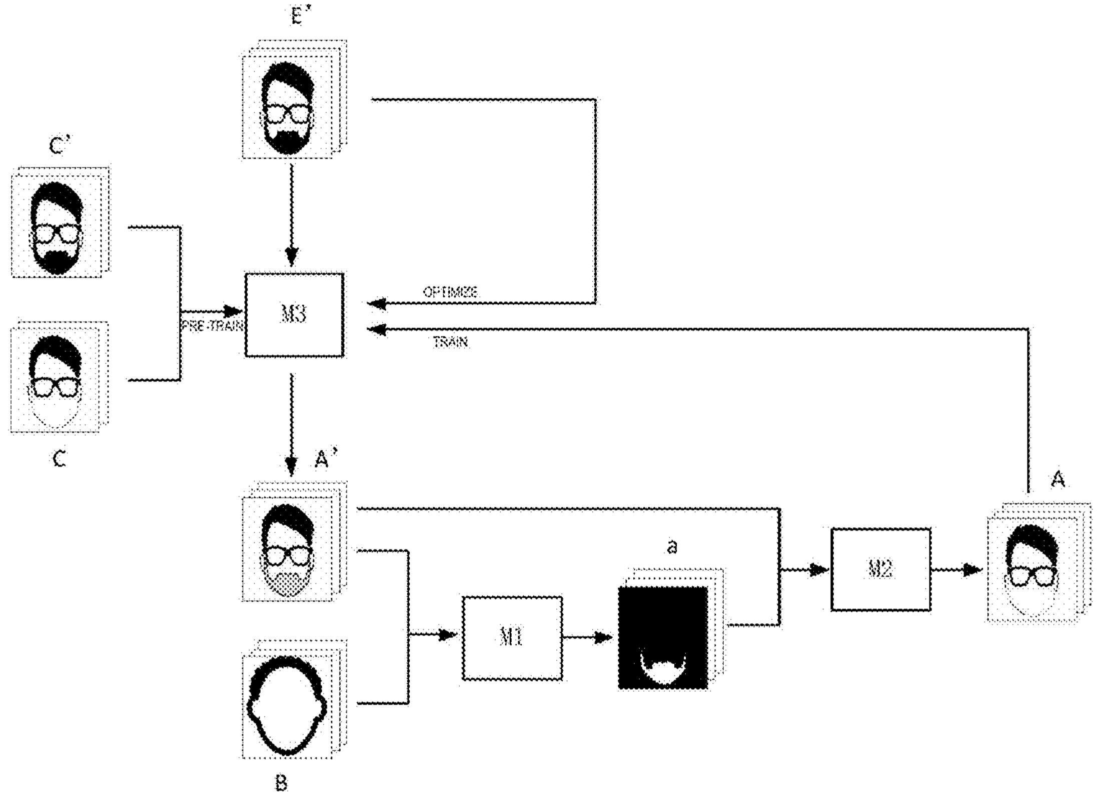
FIG. 5 shows a schematic diagram of a predetermined model training step in a method of image processing provided by another embodiment of the present disclosure.

As an example, FIG. 5 shows a schematic diagram of a predetermined model training step in a method of image processing provided by another embodiment of the present disclosure. Referring to FIG. 5, the first number of paired fourth and fifth facial images C' and C' can be used to pre-train the third model M3, which is less effective in removing predefined objects (e.g., beards) due to the small number of pairs. A second number of sixth face images E' can be processed to obtain a large number of first face images A' with the preliminary trained third model. The process of training the first model M1 and the second model M2 based on the first facial image A' and the second facial image B can be seen in FIG. 2. The trained second model outputs the third facial image A with the predetermined objects removed, and thus a large number of pairs of data, i.e., the third facial image A and the sixth facial image E', can be obtained. The third model M3 can be optimally trained with the third face image A and the sixth face image E', so that the third model has a better effect of removing the predetermined objects.

In the present embodiment, the optimized and trained third model can perform the removal of the predetermined objects in the facial image, and the integrated model of the trained first model and the second model can further perform the removal of the predetermined objects in the facial image. The optimized and trained third model, or the integrated model, may be integrated into an electronic device, such as a server or client device, to implement the facial image beautification function by performing the effect of removing the predetermined objects from the facial image online.

In addition, the third model is usually smaller in size compared to the integration model, which makes it easier to integrate in electronic devices with limited storage/computing resources, e.g., in the client. The steps for training the integration model are more simplified than the steps for training the third model, which is more favorable for quickly training a model that removes the effects of the predefined objects. Therefore, depending on the specific needs of the application scene, we can selectively train either the integration model or the third model, and both of them can achieve the effect of removing the predetermined objects.

According to the technical solutions of the embodiments of the present disclosure, the trained first model and the trained second model can be integrated to obtain a predetermined model, or the optimized and trained third model can be determined as the predetermined model. The integrated model or the third model can be selectively trained based on the specific needs of the actual application scene, which enriches the generation method of the predetermined model. The program of model training in the method of image processing provided by the embodiments of the present disclosure and the program of model training in the method of image processing provided by the above embodiments belong to the same public idea, and the technical details not described in detail in the present embodiments can be found in the above embodiments, and the same technical features have the same beneficial effects in the present embodiments and the above embodiments.

Figure 6:
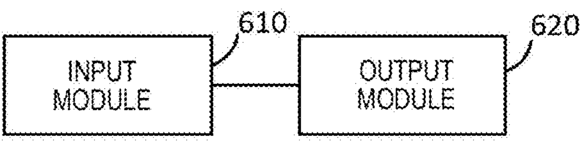
FIG. 6 shows a structural schematic diagram of an apparatus for image processing provided by an embodiment of the present disclosure.

FIG. 6 shows a structural schematic diagram of an apparatus for image processing provided by an embodiment of the present disclosure. The apparatus for model training provided by the present embodiment is applicable to a situation in which a predetermined object in an image is removed with a predetermined model obtained by training on unpaired data.

Referring to FIG. 6, the apparatus for image processing according to the present embodiment may comprise:

- an input module 610 configured to input a to-be-processed facial image to a predetermined model; and
- an output module 620 configured to output, by the predetermined model, a target facial image with a predetermined object removed from the to-be-processed facial image;
- wherein the predetermined model is trained and generated based on an attention map of the predetermined object.

For example, the predetermined object comprises a beard, a bang, or an eye bag.

For example, the apparatus for image processing may further comprise:

A model training module is configured to generate a predetermined model based on the following:

- training a first model based on a first facial image containing the predetermined object and a second facial image without the predetermined object;

outputting, by the trained first model, an attention map of the predetermined object in the first facial image;

training a second model based on the first facial image and the attention map; and generating the predetermined mode based on the trained first model and the trained second model.

For example, the model training module may comprise:

The first model training unit may be configured to train the first model based on the following:

setting different image labels for the first facial image and the second facial image;

inputting the first facial image, the second facial image, and the image labels corresponding to the respective facial images into the first model;

determining a candidate object by the first model, and outputting prediction labels for the first facial image and the second facial image based on the candidate object; and training the first model based on the prediction labels and the set image labels, and determining the candidate object determined by the trained first model as the predetermined object.

For example, the model training module may further comprise:

The second model training unit may be configured to train the second model based on the following:

inputting the first facial image and the attention map to the second model, and outputting, by the second model, a third facial image with the predetermined object removed from the first facial image; and inputting the second facial image and the third facial image to a first discriminator, and training the second model based on a result of the first discriminator.

For example, the second model training unit may be configured to:

process, by the second model and based on the attention map, pixel points corresponding to the predetermined object in the first facial image and output the third facial image with the predetermined object removed.

For example, the second model training unit may be configured to:

copy and transfer a pixel point not labeled by the attention map in the first facial image to a location of a pixel point labeled by the attention map; and wherein the pixel point labeled by the attention map belongs to the predetermined object.

For example, the second model training unit may further be configured to: before outputting the third facial image with the predetermined object removed, perform predetermined adjusting processing the third facial image.

For example, the model training module may be configured to:

establish a connection between an output layer of the trained first model and an input layer of the trained second model, to integrate into the predetermined model.

For example, the model training module may comprise:

a first facial obtaining module configured to obtain the first facial image based on the following:

obtaining a first number of fourth facial images containing the predetermined object and fifth facial images that are corresponding to the fourth facial images and contain no predetermined object, and a second number of sixth facial images containing the predetermined object; wherein the second number is greater than the first number;

pre-training the third model based on the fourth facial images and the fifth facial images;

inputting the sixth facial images into the pre-trained third model, and determining an image output by the pre-trained third model as the first facial image;

correspondingly, the model training module can be configured to:

process the first facial image, the trained first model, and the trained second model to obtain a third facial image with the predetermined object removed from the first facial image; and optimize and train the third model based on the third facial image and the sixth facial image, and determine the optimized and trained third model as the predetermined model.

For example, the model training module can comprise:

a third model training unit configured to pre-train the third model based on the following:

inputting the fourth facial image to the third model, to cause the third model to output a seventh facial image; and inputting the fifth facial image and the seventh facial image to a second discriminator, and pre-training the third model based on a result of the second discriminator.

The apparatus for image processing provided in the embodiments of the present disclosure can perform the method for image processing provided in any embodiment of the present disclosure, and is equipped with functional modules and beneficial effects corresponding to the performance of the method.

It is worth noting that the plurality of units and modules comprised in the above apparatus are only divided according to functional logic, but are not limited to the above division, as long as they are capable of implementing the corresponding functions; furthermore, the specific names of the plurality of functional units are only for the purpose of facilitating differentiation between each other, and are not intended to limit the scope of protection of the embodiments of the present disclosure.

Figure 7:
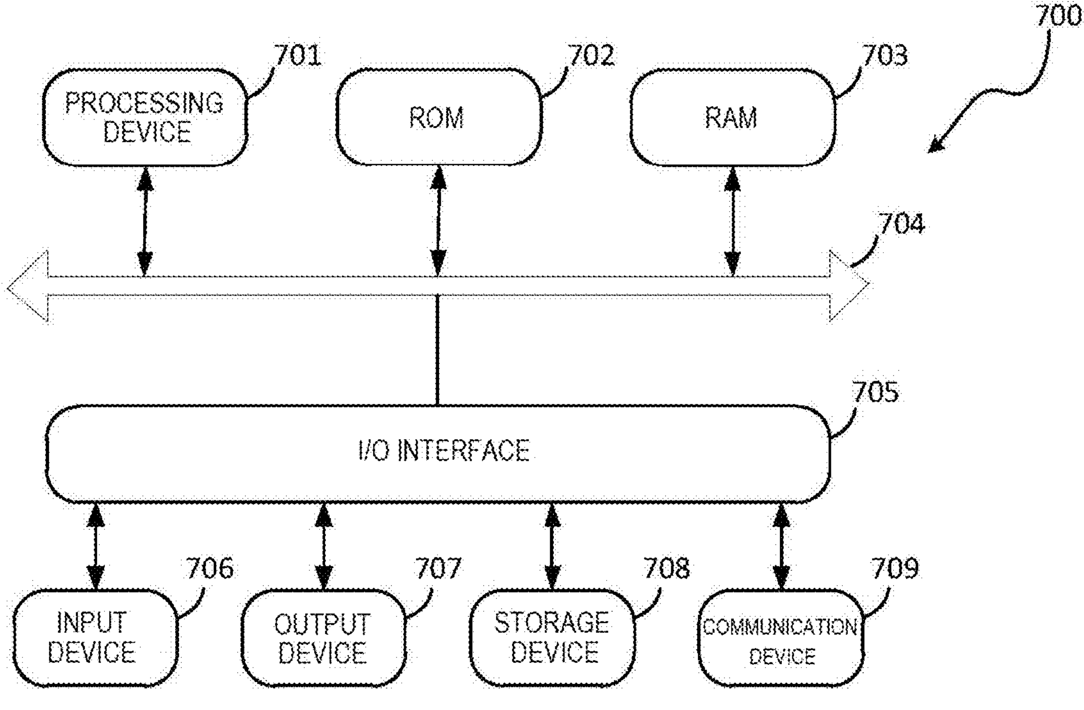
FIG. 7 shows a structural schematic diagram of an electronic device provided by an embodiment of the present disclosure is provided.

Referring now to FIG. 7, which shows a structural schematic diagram of an electronic device ((e.g., terminal device or server in FIG. 7) 700 provided by an embodiment of the present disclosure is provided. The terminal device in embodiments of the present disclosure may comprise an electronic device such as a cell phone, a laptop computer, a digital broadcast receiver, a Personal Digital Assistant (PDA), a Portable Android Device (PAD), a Portable Media Player (PMP), an in-vehicle terminal (e.g., an in-vehicle navigation terminal), and the like, and fixed terminals such as a digital television (TV), a desktop computer, and the like. The electronic device illustrated in FIG. 7 is merely an example and should not impose any limitations on the functionality and scope of use of embodiments of the present disclosure.

As shown in FIG. 7, the electronic device 700 may comprise a processing device (e.g., a central processor, a graphics processor, etc.) 701, which may perform a variety of appropriate actions and processes based on a program stored in Read-Only Memory (ROM) 702 or loaded from the storage device 708 into Random Access Memory (RAM) 703 to perform various appropriate actions and processes. Various programs and data required for operation of the electronic device 700 are also stored in the RAM 703. The processing device 701, the ROM 702, and the RAM 703 are connected to each other via the bus 704. An input/output (I/O) interface 705 is also connected to bus 704.

Generally, the following devices may be connected to the I/O interface 705: an input device 706 comprising, for example, a touch screen, a touch pad, a keyboard, a mouse, a video camera, a microphone, an accelerometer, a gyroscope, and the like; an output device 707 comprising, for example, a liquid crystal display (LCD), a speaker, a vibrator, and the like; a storage device 708 comprising, for example, a magnetic tape, a hard disk, and the like; and a communication device 709. The communication device 709 may allow the electronic device 700 to communicate wirelessly or wiredly with other devices to exchange data. Although FIG. 7 illustrates electronic device 700 with various devices, it should be understood that it is not required to implement or have all of the illustrated devices. More or fewer devices may alternatively be implemented or possessed.

In particular, according to embodiments of the present disclosure, the process described with reference to the flowchart above may be implemented as a computer software program. For example, embodiments of the present disclosure comprise a computer program product comprising a computer program hosted on a non-transitory computer-readable medium, the computer program comprising program code for executing the method shown in the flowchart. In such embodiments, the computer program may be downloaded and installed from a network via a communication device 709, or from a storage device 708, or from a ROM 702. When the computer program is executed by the processing device 701, the above functions defined in the method of the embodiments of the present disclosure are performed.

The electronic device provided by the embodiments of the present disclosure and the method of image processing provided by the embodiments described above belong to the same disclosure concept, and technical details not described in detail in the present embodiments can be found in the embodiments described above, and the present embodiments and the embodiments described above have the same beneficial effects.

The embodiments of the present disclosure provide a storage medium comprising computer-executable instructions, the computer-executable instructions, when executed by a computer processor, implementing the method of image processing provided by the above embodiments.

It is noted that the computer-readable medium described above in the present disclosure may be a computer-readable signal medium or a computer-readable storage medium or any combination thereof. The computer-readable storage medium may, for example, be a system, device, or apparatus or device of electricity, magnetism, light, electromagnetism, infrared, or semiconductors, or an electrical connection of any one or more wires, or a combination of the above. The computer-readable storage medium may comprise: portable computer disk, hard disk, random access memory (RAM), read-only memory (ROM), erasable programmable read-only memory (Erasable Programmable Read-Only Memory, EPROM, or flash memory), optical fiber, portable compact disk read-only memory (Compact Disc Read-Only Memory, CD-ROM, optical storage device, magnetic storage device, or any suitable combination of the foregoing. For purposes of the present disclosure, a computer-readable storage medium may be any tangible medium that contains or stores a program that may be used by or in combination with an instruction execution system, apparatus, or component. And in the present disclosure, a computer-readable signal medium may comprise a data signal propagated in a baseband or as part of a carrier carrying computer-readable program code. Such propagated data signals may take a variety of forms, comprising electromagnetic signals, optical signals, or any suitable combination of the foregoing. The computer-readable signal medium may also be any computer-readable medium other than a computer-readable storage medium that sends, disseminates, or transmits a program for use by, or in conjunction with, an instruction-executing system, apparatus, or component. The program code contained on the computer-readable medium may be transmitted using any suitable medium, comprising: wire, fiber optic cable, radio frequency (RF), etc., or any suitable combination thereof.

In some implementations, clients, servers may communicate with any currently known or future developed network protocol such as Hypertext Transfer Protocol (HTTP) and may be interconnected with any form or medium of digital data communication (e.g., a communications network). Examples of communication networks comprise Local Area Networks (LAN), Wide Area Networks (WAN), Internet (e.g., the Internet), and End-to-End Networks (e.g., ad hoc End-to-End Networks), as well as any currently known or future developed networks.

The computer-readable medium may be included in the above-mentioned electronic device; it may also exist separately and not be assembled into the electronic device.

The computer-readable medium carries one or more programs that, when the one or more programs are executed by the electronic device, enable the electronic device:

inputting a to-be-processed facial image to a predetermined model; and outputting, by the predetermined model, a target facial image with a predetermined object removed from the to-be-processed facial image;

wherein the predetermined model is trained and generated based on an attention map of the predetermined object.

Computer program code for performing the operations of the present disclosure may be written in one or more programming languages, or combinations thereof, including object-oriented programming languages such as Java, Smalltalk, C++, conventional procedural programming languages such as the "C" language, or similar programming languages. or similar programming languages. The program code may be executed entirely on the user's computer, partially on the user's computer, as a separate software package, partially on the user's computer and partially on a remote computer, or entirely on a remote computer or server. In the case of a remote computer, the remote computer may be connected to the user's computer over any kind of network, including a LAN or WAN, or it may be connected to an external computer (e.g., via an Internet connection using an Internet service provider)

The flowcharts and block diagrams in the accompanying drawings illustrate the architecture, functionality, and operation of systems, methods, and computer program products that may be implemented in accordance with various embodiments of the present disclosure. At this point, respective box in the flowcharts or block diagrams may represent a module, program segment, or portion of code that contains one or more executable instructions for implementing a specified logical function. It should also be noted that in some implementations that are determined to be substitutions, the functions indicated in the boxes may also occur in a different order than that indicated in the accompanying drawings. For example, two consecutively represented boxes may actually be executed substantially in parallel, and they may sometimes be executed in reverse order, depending on the function involved. It should also be noted that respective of the boxes in the block diagrams and I or flowcharts, as well as combinations of the boxes in the block diagrams and I or flowcharts, may be implemented in a dedicated hardware-based system that performs the specified function or operation, or may be implemented in a combination of dedicated hardware and computer instructions.

Units described as being involved in embodiments of the present disclosure may be implemented by way of software or may be implemented by way of hardware. Wherein the name of a unit does not in some cases constitute a limitation of the unit itself, for example, a first obtaining unit may also be described as "a unit for obtaining at least two Internet Protocol addresses".

The functions described above herein may be performed, at least in part, by one or more hardware logic components. For example, exemplary types of hardware logic components that may be used include: Field Programmable Gate Array (FPGA), Application Specific Integrated Circuit (ASIC), Application Specific Standard Parts (ASSP), System on Chip (SOC), and System on Chip (SOC). Application Specific Standard Parts (ASSP), System on Chip (System on Chip, SOC), Complex Programmable Logic Device (Complex Programmable logic device CPLD) and so on.

In the context of the present disclosure, a machine-readable medium may be a tangible medium that may include or store a program for use by or in conjunction with an instruction execution system, device, or apparatus. The machine-readable medium may be a machine-readable signal medium or a machine-readable storage medium. The machine-readable medium may comprise an electronic, magnetic, optical, electromagnetic, infrared, or semiconductor system, device, or apparatus, or any suitable combination thereof. Machine-readable storage media may comprise an electrical connection based on one or more wires, a portable computer disk, a hard disk, a random access memory (RAM), a read-only memory (ROM), an erasable programmable read-only memory (EPROM or flash memory), a fiber optic, a compact disk-read-only memory (CD-ROM) for convenience, an optical storage device, a magnetic storage device, or any suitable combination of the foregoing. or any suitable combination thereof.

According to one or more embodiments of the present disclosure, [Example 1] provides a method of image processing, comprising:

inputting a to-be-processed facial image to a predetermined model; and outputting, by the predetermined model, a target facial image with a predetermined object removed from the to-be-processed facial image;

wherein the predetermined model is trained and generated based on an attention map of the predetermined object.

According to one or more embodiments of the present disclosure, [Example 2] provides a method of image processing, further comprising:

for example, the predetermined object comprises a beard, a bang, or an eye bag.

According to one or more embodiments of the present disclosure, [Example 3] provides a method of image processing, further comprising:

for example, the predetermined model is generated based on the following:

training a first model based on a first facial image containing the predetermined object and a second facial image without the predetermined object;

outputting, by the trained first model, an attention map of the predetermined object in the first facial image;

training a second model based on the first facial image and the attention map; and generating the predetermined mode based on the trained first model and the trained second model.

According to one or more embodiments of the present disclosure, [Example 4] provides a method of image processing, further comprising:

for example, the first model is trained based on the following:

setting different image labels for the first facial image and the second facial image;

inputting the first facial image, the second facial image, and the image labels corresponding to the respective facial images into the first model;

determining a candidate object by the first model, and outputting prediction labels for the first facial image and the second facial image based on the candidate object; and training the first model based on the prediction labels and the set image labels and determining the candidate object determined by the trained first model as the predetermined object.

According to one or more embodiments of the present disclosure, [Example 5] provides a method of image processing, further comprising:

for example, the second model is trained based on the following:

inputting the first facial image and the attention map to the second model, and outputting, by the second model, a third facial image with the predetermined object removed from the first facial image; and inputting the second facial image and the third facial image to a first discriminator and training the second model based on a result of the first discriminator.

According to one or more embodiments of the present disclosure, [Example 6] provides a method of image processing, further comprising:

for example, outputting, by the second model, a third facial image with the predetermined object removed from the first facial image comprises:

processing, by the second model and based on the attention map, pixel points corresponding to the predetermined object in the first facial image, and outputting the third facial image with the predetermined object removed.

According to one or more embodiments of the present disclosure, [Example 7] provides a method of image processing, further comprising:

for example, processing pixel points corresponding to the predetermined object in the first facial image comprises:

copying and transferring a pixel point not labeled by the attention map in the first facial image to a location of a pixel point labeled by the attention map; and wherein the pixel point labeled by the attention map belongs to the predetermined object.

According to one or more embodiments of the present disclosure, [Example 8] provides a method of image processing, comprising:

for example, before outputting the third facial image with the predetermined object removed, performing predetermined adjusting processing the third facial image.

According to one or more embodiments of the present disclosure, [Example 9] provides a method of image processing, comprising:

for example, generating the predetermined mode based on the trained first model and the trained second model comprises:

establishing a connection between an output layer of the trained first model and an input layer of the trained second model, to integrate into the predetermined model.

According to one or more embodiments of the present disclosure, [Example 10] provides a method of image processing, comprising:

for example, the first facial image is obtained based on the following:

obtaining a first number of fourth facial images containing the predetermined object and fifth facial images that are corresponding to the fourth facial images and contain no predetermined object, and a second number of sixth facial images containing the predetermined object; wherein the second number is greater than the first number;

pre-training the third model based on the fourth facial images and the fifth facial images;

inputting the sixth facial images into the pre-trained third model, and determining an image output by the pre-trained third model as the first facial image; and correspondingly, generating the predetermined mode based on the trained first model and the trained second model comprising:

processing the first facial image, the trained first model, and the trained second model to obtain a third facial image with the predetermined object removed from the first facial image; and optimizing and training the third model based on the third facial image and the sixth facial image, and determining the optimized and trained third model as the predetermined model.

According to one or more embodiments of the present disclosure, [Example 11] provides a method of image processing, comprising:

for example, the third model is pre-trained based on the following:

inputting the fourth facial image to the third model, to cause the third model to output a seventh facial image; and inputting the fifth facial image and the seventh facial image to a second discriminator, and pre-training the third model based on a result of the second discriminator.

Furthermore, although a plurality of operations is depicted in a particular order, this should not be construed as requiring that the operations be performed in the particular order shown or in sequential order of performance. In certain environments, multitasking and parallel processing may be advantageous. Similarly, while a plurality of implementation details is included in the above discussion, these should not be construed as limiting the scope of the present disclosure. Some of the features described in the context of separate embodiments may also be implemented in combination in a single embodiment. Conversely, a plurality of features described in the context of a single embodiment may also be implemented in a plurality of embodiments, either individually or in any suitable sub-combination.

I claim:

1. A method of image processing, comprising:

inputting a to-be-processed facial image to a predetermined model; and outputting, by the predetermined model, a target facial image with a predetermined object removed from the to-be-processed facial image;

wherein the predetermined model is trained and generated based on an attention map of the predetermined object; and wherein the predetermined model is generated based on the following:

training a first model based on a first facial image containing the predetermined object and a second facial image without the predetermined object;

outputting, by the trained first model, an attention map of the predetermined object in the first facial image; and training a second model based on the first facial image and the attention map; and generating the predetermined model based on the trained first model and the trained second model.

2. The method of image processing according to claim 1, wherein the predetermined object comprises a beard, a bang, or an eye bag.

3. The method of image processing according to claim 1, wherein the first model is trained based on the following:

setting different image labels for the first facial image and the second facial image;

inputting the first facial image, the second facial image, and the image labels corresponding to the respective facial images into the first model;

determining a candidate object by the first model, and outputting prediction labels for the first facial image and the second facial image based on the candidate object; and training the first model based on the prediction labels and the set image labels, and determining the candidate object determined by the trained first model as the predetermined object.

4. The method of image processing according to claim 1, wherein the second model is trained based on the following:

inputting the first facial image and the attention map to the second model, and outputting, by the second model, a third facial image with the predetermined object removed from the first facial image; and inputting the second facial image and the third facial image to a first discriminator and training the second model based on a result of the first discriminator.

5. The method of image processing according to claim 3, wherein outputting, by the second model, a third facial image with the predetermined object removed from the first facial image comprises:

processing, by the second model and based on the attention map, pixel points corresponding to the predetermined object in the first facial image, and outputting the third facial image with the predetermined object removed.

6. The method of image processing according to claim 5, wherein processing pixel points corresponding to the predetermined object in the first facial image comprises:

copying and transferring a pixel point not labeled by the attention map in the first facial image to a location of a pixel point labeled by the attention map; and wherein the pixel point labeled by the attention map belongs to the predetermined object.

7. The method of image processing according to claim 5, further comprising: before outputting the third facial image with the predetermined object removed, performing predetermined adjusting processing the third facial image.

8. The method of image processing according to claim 1, wherein generating the predetermined model based on the trained first model and the trained second model comprises:

establishing a connection between an output layer of the trained first model and an input layer of the trained second model, to integrate into the predetermined model.

9. The method of claim 1, wherein the first facial image is obtained based on the following:

obtaining a first number of fourth facial images containing the predetermined object and fifth facial images that are corresponding to the fourth facial images and contain no predetermined object, and a second number of sixth facial images containing the predetermined object; wherein the second number is greater than the first number;

pre-training the third model based on the fourth facial images and the fifth facial images; inputting the sixth facial images into the pre-trained third model, and determining an image output by the pre-trained third model as the first facial image; and wherein generating the predetermined model based on the trained first model and the trained second model comprises:

processing the first facial image, the trained first model, and the trained second model to obtain a third facial image with the predetermined object removed from the first facial image; and optimizing and training the third model based on the third facial image and the sixth facial image, and determining the optimized and trained third model as the predetermined model.

10. The method of claim 9, wherein the third model is pre-trained based on the following:

inputting the fourth facial image to the third model, to cause the third model to output a seventh facial image; and inputting the fifth facial image and the seventh facial image to a second discriminator, and pre-training the third model based on a result of the second discriminator.

11. An electronic device, comprising: one or more processors; and a storage apparatus configured to store one or more programs;

wherein the one or more programs, when executed by the one or more processors, cause the one or more processors to implement the method of image processing comprising:

inputting a to-be-processed facial image to a predetermined model; and outputting, by the predetermined model, a target facial image with a predetermined object removed from the to-be-processed facial image;

wherein the predetermined model is trained and generated based on an attention map of the predetermined object; and wherein the predetermined model is generated based on the following:

training a first model based on a first facial image containing the predetermined object and a second facial image without the predetermined object;

outputting, by the trained first model, an attention map of the predetermined object in the first facial image; and training a second model based on the first facial image and the attention map; and generating the predetermined model based on the trained first model and the trained second model.

12. The electronic device of claim 11, wherein the predetermined object comprises a beard, a bang, or an eye bag.

13. The electronic device of claim 11, wherein the first model is trained based on the following:

setting different image labels for the first facial image and the second facial image;

inputting the first facial image, the second facial image, and the image labels corresponding to the respective facial images into the first model;

determining a candidate object by the first model, and outputting prediction labels for the first facial image and the second facial image based on the candidate object; and training the first model based on the prediction labels and the set image labels, and determining the candidate object determined by the trained first model as the predetermined object.

14. The electronic device of claim 11, wherein the second model is trained based on the following:

inputting the first facial image and the attention map to the second model, and outputting, by the second model, a third facial image with the predetermined object removed from the first facial image; and inputting the second facial image and the third facial image to a first discriminator and training the second model based on a result of the first discriminator.

15. The electronic device of claim 14, wherein outputting, by the second model, a third facial image with the predetermined object removed from the first facial image comprises:

processing, by the second model and based on the attention map, pixel points corresponding to the predetermined object in the first facial image, and outputting the third facial image with the predetermined object removed.

16. The electronic device of claim 15, wherein processing pixel points corresponding to the predetermined object in the first facial image comprises:

copying and transferring a pixel point not labeled by the attention map in the first facial image to a location of a pixel point labeled by the attention map; and wherein the pixel point labeled by the attention map belongs to the predetermined object.

17. The electronic device of claim 15, wherein the method further comprises, before outputting the third facial image with the predetermined object removed, performing predetermined adjusting processing the third facial image.

18. A non-transitory storage medium comprising computer-executable instructions, the computer-executable instructions, when executed by a computer processor, causing the method of image processing comprising:

inputting a to-be-processed facial image to a predetermined model; and outputting, by the predetermined model, a target facial image with a predetermined object removed from the to-be-processed facial image;

wherein the predetermined model is trained and generated based on an attention map of the predetermined object; and wherein the predetermined model is generated based on the following:

training a first model based on a first facial image containing the predetermined object and a second facial image without the predetermined object;

outputting, by the trained first model, an attention map of the predetermined object in the first facial image; and training a second model based on the first facial image and the attention map; and generating the predetermined model based on the trained first model and the trained second model.

* * * * *